(12) United States Patent
Zhao et al.

(10) Patent No.: US 12,256,289 B2
(45) Date of Patent: Mar. 18, 2025

(54) REAL-TIME REMOTE GUIDE SYSTEM BASED ON BIG DATA NETWORK

(71) Applicant: Meng Zhao, Zaozhuang (CN)

(72) Inventors: Meng Zhao, Zaozhuang (CN); Yunjun Zhao, Zaozhuang (CN); Jianling Man, Zaozhuang (CN)

(73) Assignee: Meng Zhao, Zaozhuang (CN)

( * ) Notice: Subject to any disclaimer, the term of this patent is extended or adjusted under 35 U.S.C. 154(b) by 465 days.

(21) Appl. No.: 17/828,219

(22) Filed: May 31, 2022

(65) Prior Publication Data

US 2023/0319505 A1 Oct. 5, 2023

(30) Foreign Application Priority Data

Mar. 31, 2022 (CN) .......................... 202210343988.6

(51) Int. Cl.
*H04W 4/024* (2018.01)
*G06Q 10/02* (2012.01)
*G06Q 50/14* (2012.01)
*H04W 4/02* (2018.01)

(52) U.S. Cl.
CPC .......... *H04W 4/024* (2018.02); *G06Q 10/025* (2013.01); *G06Q 50/14* (2013.01); *H04W 4/023* (2013.01)

(58) Field of Classification Search
CPC .................................. H04W 4/24; H04W 4/02
See application file for complete search history.

(56) References Cited

FOREIGN PATENT DOCUMENTS

| | | | |
|---|---|---|---|
| CN | 101697605 A | 4/2010 | |
| CN | 106205434 A | 12/2016 | |
| CN | 110111500 A | 8/2019 | |
| JP | 6757913 B2 * | 9/2020 | ......... G06F 16/5838 |
| KR | 100751390 B1 * | 8/2007 | |

* cited by examiner

*Primary Examiner* — Kevin Kim

(57) ABSTRACT

The present invention relates to the technical field of remote guide, in particular to a real-time remote guide system based on a big data network, comprising a service terminal and a guide terminal. Scenic spots are explained in a real-time online mode. At the same time, a disabled person acts as a guide, and then transmits the positions of the tourists and the surrounding pictures to the guide through the positioning and shooting unit, to facilitate the guide for guiding the tourists and explaining the scenic spots. Thus, the guide does not bear the busyness of the travel for a long time, and jobs are provided for the disabled person.

8 Claims, 1 Drawing Sheet

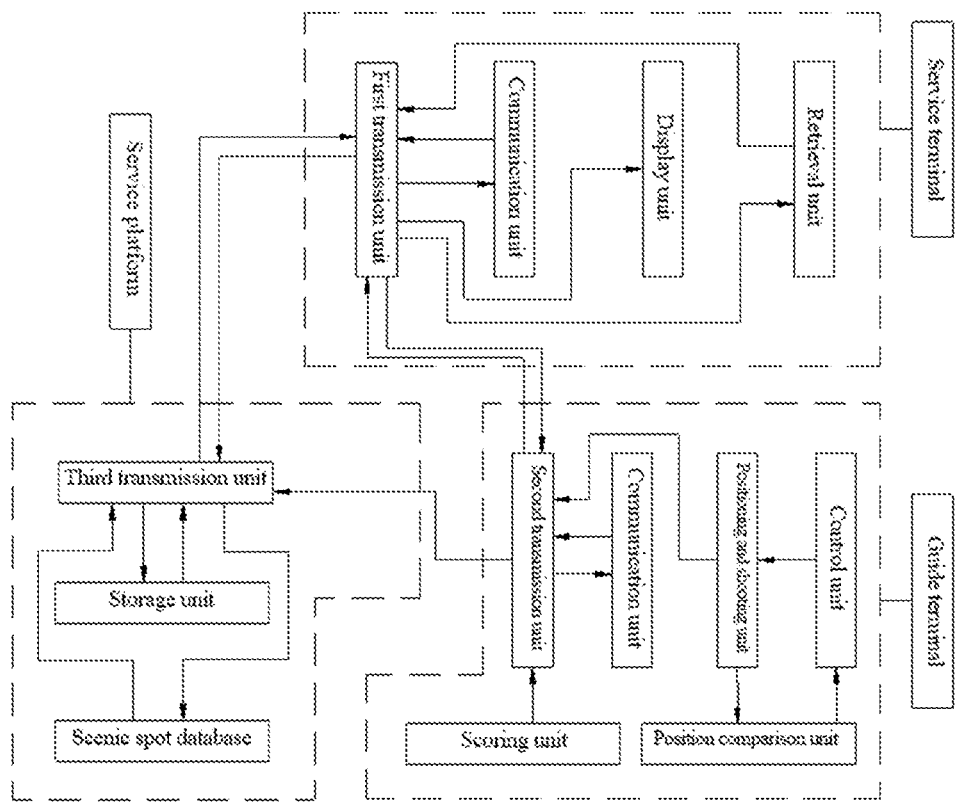

REAL-TIME REMOTE GUIDE SYSTEM BASED ON BIG DATA NETWORK

CROSS-REFERENCE TO RELATED APPLICATIONS

The application claims priority to Chinese patent application No. 202210343988.6, filed on Mar. 31, 2022, the entire contents of which are incorporated herein by reference.

TECHNICAL FIELD

The present invention relates to the technical field of remote guide, in particular to a real-time remote guide system based on a big data network.

BACKGROUND

With the continuous improvement of living standards of people, the number of people who go out to travel is increasing every year, and people travel around the world to enrich own experience and relax. After arriving at unfamiliar environments, tourists need the guidance and help of a guide to better play and arrange accommodation.

Guides mainly include Chinese guides and foreign language guides, with the main work to guide the tourists to experience the beauty of landscapes, solve emergencies that may occur during travel, and help the tourists in food, accommodation and travel.

A guide needs to lead tourists to all parts of the country and even around the world to play, and needs to endure long-term travel and spend most of time in vehicles and walking to introduce scenic spots. Therefore, there are certain requirements for the physical fitness and physical quality of the guide. This is a huge challenge for people with poor physical fitness and poor physical quality.

At the same time, the disabled person is inconvenient for movement due to physical disability, and is not suitable for long-distance travel and explanation of scenic spots. In addition, the physical fitness of the disabled person is also weaker than that of normal people, which is also a main reason that the disabled person cannot engage in the guide industry.

In view of this, to overcome the above technical problems, the present invention proposes a real-time remote guide system based on a big data network, thereby solving the above technical problems.

SUMMARY

In order to overcome the defects of the prior art, the present invention proposes a real-time remote guide system based on a big data network, which explains scenic spots in a real-time online mode, and guides the itinerary of tourists. At the same time, the disabled person acts as a guide, communicates and interacts with the tourists at a service terminal, and then transmits the positions of the tourists and the surrounding pictures to the guide through a positioning and shooting unit, to facilitate the guide for guiding the tourists and explaining the scenic spots. That is, the guide does not need to travel with the tourists, so that the guide does not bear the busyness of the travel for a long time, and jobs are provided for the disabled person.

The real-time remote guide system based on the big data network in the present invention comprises a service terminal and a guide terminal; and the service terminal and the guide terminal are connected through a network for data transmission;

The service terminal uses an electronic device as a carrier, such as a computer; the service terminal comprises a first transmission unit, a communication unit, a display unit and a retrieval unit; the retrieval unit retrieves the scenic information of a tourist destination and the information about accommodation and itinerary, and then transmits the information to a service platform through the first transmission unit; and the display unit is used to display position and picture information transmitted by the guide terminal;

The guide terminal uses an electronic device as a carrier, such as a mobile phone or a wearable device with positioning and shooting functions (a hat, an earphone, glasses, etc.); the guide terminal comprises a second transmission unit, a communication unit and a positioning and shooting unit; the second transmission unit and the first transmission unit are connected through Internet, so as to realize communication between the service terminal and two communication units in the guide terminal to complete online real-time guide; and the positioning and shooting unit transmits a position and surrounding images of a tourist during travel to the service terminal in real time.

Preferably, the guide terminal further comprises a control unit and a position comparison unit; the control unit is used to control the operation of the positioning and shooting unit; the position comparison unit has a built-in map, and the position comparison unit calculates the position of the tourist and a distance between a toilet and a bathroom on the map in real time.

Preferably, the real-time remote guide system based on the big data network further comprises a service platform; the service platform uses an electronic device as a carrier, such as a server; the service platform comprises a third transmission unit and a storage unit; the third transmission unit receives the scenic information of tourist playing and information about accommodation and itinerary, transmitted by the first transmission unit, and then transmits the information to the storage unit; and a guide retrieves the information in the storage unit while communicating with the tourist in real time.

Preferably, the guide terminal further comprises a scoring unit; and the scoring unit transmits scores of the tourist for services provided by the guide into the storage unit of the service platform.

Preferably, the communication unit of the service terminal transmits words, voice or videos communicated with the tourist to the storage unit of the service platform after completing the guide work for the tourist.

Preferably, the storage unit deletes the data of the tourist two days after the tourist submits the evaluation.

Preferably, the service platform further comprises a scenic spot database; the scenic spot database stores the information of scenic spots around the world and surrounding accommodation; and the evaluation of the tourist for the scenic spots and accommodation is synchronously uploaded into the scenic spot database.

Preferably, the scenic spot database sorts the scenic spots in various places according to the scores of tourists.

Preferably, the scoring unit performs anonymous processing when uploading the scores and evaluations of tourists to the service platform.

The present invention has the following beneficial effects:

1. The system explains the scenic spots in a real-time online mode, and guides the itinerary of the tourists. At the same time, the disabled person acts as a guide, communicates and interacts with the tourists at the service terminal, and then transmits the positions of the tourists and the surrounding pictures to the guide through the positioning and shooting unit, to facilitate the guide for guiding the tourists and explaining the scenic spots. That is, the guide does not need to travel with the tourists, so that the guide does not bear the busyness of the travel for a long time, and jobs are provided for the disabled person.

2. The system controls the shooting part of the positioning and shooting unit through the control unit. When the tourists approach or enter private places such as toilets or bathrooms, the shooting part of the positioning and shooting unit is controlled and closed to stop the transmission of pictures around the tourists. The shooting part of the positioning and shooting unit is turned on after the tourists leave the toilets or bathrooms, which protects the privacy of the tourists and people in the toilets and the bathrooms. At the same time, a physical button is arranged on a wearable device, and the tourists can actively close the shooting part of the positioning and shooting unit when it is inconvenient, thereby improving the use experience of the tourists.

BRIEF DESCRIPTION OF DRAWINGS

The present invention will be further described below in combination with the drawings and the embodiments.

FIG. 1 is a flow block diagram of a system in the present invention.

DETAILED DESCRIPTION OF THE EMBODIMENTS

To easily understand the technical means, the creative feature, the purpose and the effect realized by the present invention, the present invention is further elaborated below in combination with specific embodiments.

As shown in FIG. 1, a real-time remote guide system based on a big data network in the present invention comprises a service terminal and a guide terminal; and the service terminal and the guide terminal are connected through a network for data transmission.

The service terminal uses an electronic device as a carrier, such as a computer; the service terminal comprises a first transmission unit, a communication unit, a display unit and a retrieval unit; the retrieval unit retrieves the scenic information of a tourist destination and the information about accommodation and itinerary, and then transmits the information to a service platform through the first transmission unit; and the display unit is used to display position and picture information transmitted by the guide terminal;

The guide terminal uses an electronic device as a carrier, such as a mobile phone or a wearable device with positioning and shooting functions (a hat, an earphone, glasses, etc.); the guide terminal comprises a second transmission unit, a communication unit and a positioning and shooting unit; the second transmission unit and the first transmission unit are connected through Internet, so as to realize communication between the service terminal and two communication units in the guide terminal to complete online real-time guide; and the positioning and shooting unit transmits a position and surrounding images of a tourist during travel to the service terminal in real time.

A guide needs to lead tourists to all parts of the country and even around the world to play, and needs to endure long-term travel and spend most of time in vehicles and walking to introduce scenic spots. Therefore, there are certain requirements for the physical fitness and physical quality of the guide. This is a huge challenge for people with poor physical fitness and poor physical quality.

At the same time, the disabled person is inconvenient for movement due to physical disability, and is not suitable for long-distance travel and explanation of scenic spots. In addition, the physical fitness of the disabled person is also weaker than that of normal people, which is also a main reason that the disabled person cannot engage in the guide industry.

The communication unit of the guide terminal is communicated with the second transmission unit through a transmission line; the communication unit of the service terminal is communicated with the first transmission unit through a transmission line, and the first transmission unit and the second transmission unit are communicated through a network. Therefore, tourists and the guide can communicate through voice, words, real-time calls or real-time videos by the communication unit of the guide terminal and the communication unit of the service terminal.

Before a tourist uses the system to travel, the tourist firstly communicates with the guide served by the disabled person through the communication unit on the guide terminal, and the guide arranges travel and accommodation. When the guide arranges the accommodation for the tourist, the guide connects a search engine through the retrieval unit, so that the search engine accesses the Internet, retrieves the most cost-effective accommodation location around the travel destination of the tourist, and arranges accommodation.

If the tourist arranges own travel and accommodation, the guide does not arrange travel and accommodation. The guide will recommend and transmit a travel route and the most cost-effective accommodation location to the communication unit of the guide terminal through the communication unit of the service terminal.

When the tourist leaves for the travel, the guide communicates with the tourist and informs the tourist of the itinerary. For example, the itinerary is to take a taxi with the license plate number XXX at 9:00 in the morning to a high-speed rail station, take the XXX train of the high-speed rail at No. X entrance at 10:00 in the morning after arriving at the high-speed rail station, then leave the high-speed rail station at XX exit, take the XX bus to the accommodation at 11:10, and walk out of the accommodation at 1:30 p.m. to turn left and go straight for 1000 m to reach a scenic spot. In the movement process of the tourist, the position of the tourist and the surrounding real-time pictures are transmitted to the second transmission unit by the positioning and shooting unit through the transmission line, and thus transmitted by the second transmission unit to the first transmission unit, transmitted to a display unit of the service terminal through the transmission line, and displayed by the display unit. The guide watches the position of the tourist and the surrounding pictures displayed on the display unit, and guides the tourist.

After the tourist arrives at the scenic spot, the guide observes the position of the tourist and the pictures of the scenic spot through the display unit, communicates with the tourist through the communication unit, and explains the scenic spot. The tourist visits the scenic spot under the guidance of the guide, and then returns under the guidance of the guide.

The system explains the scenic spots in a real-time online mode, and guides the itinerary of the tourists. At the same time, the disabled person acts as a guide, communicates and interacts with the tourists at the service terminal, and then transmits the positions of the tourists and the surrounding pictures to the guide through the positioning and shooting unit, to facilitate the guide for guiding the tourists and explaining the scenic spots. That is, the guide does not need to travel with the tourists, so that the guide does not bear the busyness of the travel for a long time, and jobs are provided for the disabled person.

As an embodiment of the present invention, the guide terminal further comprises a control unit and a position comparison unit; the control unit is used to control the operation of the positioning and shooting unit; the position comparison unit has a built-in map, and the position comparison unit calculates the position of the tourist and a distance between a toilet and a bathroom on the map in real time.

When the tourist plays, the positioning and shooting unit transmits the position information of the tourist to the position comparison unit through the transmission line. When the position comparison unit calculates a distance between the position of the tourist and a private place such as a toilet or a bathroom to be less than 5 m, the position comparison unit sends out information and transmits the information to the control unit through the transmission line. Therefore, the control unit controls the shooting function of the positioning and shooting unit to close through the transmission line to protect the privacy of tourist and people in the toilet. When the distance between the tourist and the toilet or bathroom exceeds 5 m, the position comparison unit sends out information again and transmits the information to the control unit, so that the control unit controls the shooting function of the positioning and shooting unit to restart.

In addition, when the guide terminal is arranged on the wearable device, the control unit further comprises a physical button; and the physical button is installed on the wearable device and connected with a control unit circuit. After a user presses the physical button, the physical button transmits an electrical signal to the control unit, so that the control unit controls the shooting part of the positioning and shooting unit to close. The tourist presses the physical button again, and the control unit controls the shooting part of the positioning and shooting unit to open.

A cover plate that physically blocks a camera of the positioning and shooting unit can also be arranged on the wearable device. When the shooting part of the positioning and shooting unit is closed, the cover plate blocks the camera of the positioning and shooting unit. On the one hand, the possibility that the camera conducts shooting after the tourist enters the places of the toilet and the bathroom is eliminated on a physical level; and on the other hand, people in the toilet or bathroom are prevented from misunderstanding the tourist who carries the shooting apparatus.

The system controls the shooting part of the positioning and shooting unit through the control unit. When the tourists approach or enter private places such as toilets or bathrooms, the shooting part of the positioning and shooting unit is controlled and closed to stop the transmission of pictures around the tourists. The shooting part of the positioning and shooting unit is turned on after the tourists leave the toilets or bathrooms, which protects the privacy of the tourists and people in the toilets and the bathrooms. At the same time, a physical button is arranged on a wearable device, and the tourists can actively close the shooting part of the positioning and shooting unit when it is inconvenient, thereby improving the use experience of the tourists.

As an embodiment of the present invention, the real-time remote guide system based on the big data network further comprises a service platform; the service platform uses an electronic device as a carrier, such as a server; the service platform comprises a third transmission unit and a storage unit; the third transmission unit receives the scenic information of tourist playing and information about accommodation and itinerary, transmitted by the first transmission unit, and then transmits the information to the storage unit; and a guide retrieves the information in the storage unit while communicating with the tourist in real time.

When the tourist communicates with the guide before the travel, the tourist informs the guide of own preferences, such as like cooked wheaten food, mountain climbing and ancient buildings. The guide arranges the scenic spots and accommodation according to the preferences of the tourists, generates files according to the information about arranged scenic spots, accommodation and itinerary, and puts the explanation data of the scenic spots into the files. Then, the files are transmitted to the third transmission unit through the first transmission unit, and then transmitted to the storage unit by the third transmission unit through the transmission line for storage. When the guide explains the data for the tourist, the files in the storage unit are read through the display unit, and the files in the storage unit are transmitted into the display unit through the third transmission unit and the second transmission unit. The guide explains the data for the tourist according to the prompts on the files. Thus, the guide can read the files of other tourists when a tourist eats or rests, and explains the scenic spot for other tourists, thereby improving the work efficiency of the guide and ensuring the income of the disabled person. When the tourist who is eating or resting has finished eating or resting, and the guide who communicates with the tourist before is explaining for other tourists, another guide will take over the guide work for the tourist, and another guide will continue to conduct the guide work for the tourist according to the files in the storage unit.

As an embodiment of the present invention, the guide terminal further comprises a scoring unit; and the scoring unit transmits scores of the tourist for services provided by the guide into the storage unit of the service platform.

As an embodiment of the present invention, the communication unit of the service terminal transmits words, voice or videos communicated with the tourist to the storage unit of the service platform after completing the guide work for the tourist.

As an embodiment of the present invention, the storage unit deletes the data of the tourist two days after the tourist submits the evaluation.

After completing the scenic tour and returning home safely, the tourist scores and suggests the service explanation of the guide, scenic spot scenery and accommodation environments respectively through the scoring unit of the guide terminal. After the scoring and suggestion are completed, the scoring information is transmitted to the second transmission through the transmission line, and then is transmitted by the second transmission unit into the storage unit through the third transmission unit for storage. A manager accesses the storage unit of the service platform after the tourist completes the scoring and suggestion, and views the scores and suggestions of the tourist.

While the tourist completes the scoring, the communication unit of the service terminal transmits the information about words, voice or videos communicated between the guide and the tourist to the storage unit of the service platform for storage. If the tourist makes malicious evaluation for the guide and deliberately gives a low score, the manager checks communication records between the guide and the tourist to prevent malicious evaluation by the tourist and ensure the interests of the guides from disabled persons. The manager checks the evaluation of the tourist and the communication records with the guide within two days, and deletes the data of the tourist in the storage unit after two days, so as to protect the privacy of the tourist.

As an embodiment of the present invention, the service platform further comprises a scenic spot database; the scenic spot database stores the information of scenic spots around the world and surrounding accommodation; and the evaluation of the tourist for the scenic spots and accommodation is synchronously uploaded into the scenic spot database.

As an embodiment of the present invention, the scenic spot database sorts the scenic spots in various places according to the scores of tourists.

As an embodiment of the present invention, the scoring unit performs anonymous processing when uploading the scores and evaluations of tourists to the service platform.

After the evaluation of the tourist for the scenic spots and accommodations is transmitted to the third transmission unit through the second transmission unit, the third transmission unit transmits the evaluation to the scenic spot database and the storage unit simultaneously through the transmission line.

When arranging the scenic spots and accommodations for the tourist, the guide searches the scenic spot database through the retrieval unit, and retrieves the evaluation information of the scenic spots and the accommodations around the scenic spots in the scenic spot database. Therefore, the scenic spot information in the scenic spot database is transmitted to the third transmission unit through the transmission line, then is transmitted to the second transmission unit by the third transmission unit, and is transmitted to the display unit by the first transmission unit. The guide checks the evaluation of the last tourist for the scenic spot and the accommodation around the scenic spot in the scenic spot database through the display unit, and arranges scenic spots and the accommodations for new tourists as appropriate, so as to improve the travel experience of the tourists. At the same time, the scenic spot database sorts the scenic spots according to the scores given by the tourists, so that the tourist experience for the scenic spots is clear at a glance, which is convenient for the guide to arrange. The scoring unit performs anonymous processing when uploading the scores and evaluation of the tourists to the service platform, thereby protecting the privacy of the tourists.

The above shows and describes the basic principle, main features and advantages of the present invention. Those skilled in the art shall understand that the present invention is not limited by the above embodiment. The above embodiment and the description merely illustrate the principle of the present invention. Various changes and improvements can also be made to the present invention without departing from the spirit and scope of the present invention, and shall fall into the protection scope of the present invention. The protection scope of the present invention is defined by the appended claims and equivalents.

What is claimed is:

1. A real-time remote guide system based on a big data network, comprising a service terminal and a guide terminal, wherein the service terminal and the guide terminal are connected through a network for data transmission;

the service terminal uses an electronic device as a carrier; the service terminal comprises a first transmission unit, a communication unit, a display unit and a retrieval unit; the retrieval unit retrieves the scenic information of a tourist destination and information about accommodation and itinerary, and then transmits the information to a service platform through the first transmission unit; the display unit is used to display position and picture information transmitted by the guide terminal;

the guide terminal uses an electronic device as a carrier; the guide terminal comprises a second transmission unit, a communication unit, a positioning and shooting unit, a control unit and a position comparison unit; the second transmission unit and the first transmission unit are connected through Internet, so as to realize communication between the service terminal and two communication units in the guide terminal to complete online real-time guide; the positioning and shooting unit transmits a position and surrounding images of a tourist during travel to the service terminal in real time; the control unit is used to control the operation of the positioning and shooting unit; and the position comparison unit has a built-in map, and the position comparison unit calculates the position of the tourist and a distance between a toilet and a bathroom on the map in real time.

2. The real-time remote guide system based on the big data network according to claim 1, wherein the real-time remote guide system based on the big data network further comprises a service platform; the service platform uses an electronic device as a carrier; the service platform comprises a third transmission unit and a storage unit; the third transmission unit receives the scenic information of tourist playing and information about accommodation and itinerary, transmitted by the first transmission unit, and then transmits the information to the storage unit; and a guide retrieves the information in the storage unit while communicating with the tourist in real time.

3. The real-time remote guide system based on the big data network according to claim 2, wherein the guide terminal further comprises a scoring unit; and the scoring unit transmits scores and evaluation of the tourist for services provided by the guide into the storage unit of the service platform.

4. The real-time remote guide system based on the big data network according to claim 3, wherein the communication unit of the service terminal transmits words, voice or videos communicated with the tourist to the storage unit of the service platform after completing the guide work for the tourist.

5. The real-time remote guide system based on the big data network according to claim 4, wherein the storage unit deletes the data of the tourist two days after the tourist submits the evaluation.

6. The real-time remote guide system based on the big data network according to claim 2, wherein the service platform further comprises a scenic spot database; the scenic spot database stores the information of scenic spots around the world and surrounding accommodation; and the evaluation of the tourist for the scenic spots and accommodation is synchronously uploaded into the scenic spot database.

7. The real-time remote guide system based on the big data network according to claim 6, wherein the scenic spot database sorts the scenic spots in various places according to the scores of tourists.

8. The real-time remote guide system based on the big data network according to claim 3, wherein the scoring unit performs anonymous processing when uploading the scores and evaluations of tourists to the service platform.

* * * * *